United States Patent
Montgomery

(10) Patent No.: US 6,622,429 B1
(45) Date of Patent: Sep. 23, 2003

(54) SPRIG PROCESSING METHOD

(76) Inventor: Paul W. Montgomery, P.O. Box 85, Slick, OK (US) 74071

( * ) Notice: Subject to any disclaimer, the term of this patent is extended or adjusted under 35 U.S.C. 154(b) by 0 days.

(21) Appl. No.: 10/047,290

(22) Filed: Jan. 14, 2002

Related U.S. Application Data

(60) Provisional application No. 60/261,651, filed on Jan. 12, 2001.

(51) Int. Cl.$^7$ ................................................ A01C 1/00
(52) U.S. Cl. .................................................. 47/58.1 R
(58) Field of Search ........................... 47/1.01 R, 58.1 R

(56) References Cited

U.S. PATENT DOCUMENTS

| | | | |
|---|---|---|---|
| 2,852,889 A | * 9/1958 | Archibald | 47/58.1 R |
| 3,821,864 A | 7/1974 | Stottlemyer | 47/58 |
| 3,958,028 A | * 5/1976 | Burg | 426/418 |
| 4,006,561 A | * 2/1977 | Thoma et al. | 47/84 |
| 4,790,105 A | 12/1988 | Wareing et al. | 47/84 |
| 4,910,032 A | * 3/1990 | Antoon, Jr. | 426/118 |
| 4,982,526 A | 1/1991 | Miyachi | 47/56 |
| 5,090,156 A | * 2/1992 | Kawarabayashi et al. | 47/58.1 R |
| 5,331,908 A | * 7/1994 | Loeb | 111/114 |
| 5,465,530 A | * 11/1995 | Santoiemmo | 206/423 |
| PP9,888 P | * 5/1997 | Brown | |
| 5,855,091 A | * 1/1999 | Santoiemmo | 47/59 R |
| 5,884,570 A | * 3/1999 | Lincoln | 111/130 |
| 5,899,020 A | 5/1999 | Decker | 47/58 |
| 5,911,917 A | 6/1999 | Masters | 252/400.1 |
| 6,041,546 A | 3/2000 | Baranova | 47/65.8 |

FOREIGN PATENT DOCUMENTS

| | | | |
|---|---|---|---|
| DE | 2346877 | * 3/1975 | B65D/85/52 |

OTHER PUBLICATIONS

KPA Enviro Green International, The Hydro–Sprigging Revolution, Sep. 9, 2002 internet printout, □□p.–3; □□http://www.kpa–envirogreen.com/sprig1.htm.*

Sandage, Larry J. Hybrid Bermudagrass Establishment [Online], [Retrieved on Oct. 26, 2000]. Retrieved from the Internet <URL:http://www.uaex.edu/publications/pub.FSA19.htm>.

Hybrid Bermudagrass Establishment, Livrstock Newsletter [Online], Mar. 1997 [Retrieved on Oct. 26, 2000]. Retrieved from the Internet <URL:http://cumberland.ces.state.nc.us/newsletters/livestock/archives/march97.html>.

About Z–Net™ Winrock Grass Farm [Online], [Retrieved on Oct. 26, 2000], Retrieved from the Internet <URL:http://www.winrockzoysia.com/z–net.htm>.

Z–Net™ Information and Planting Instructions, Winrock Grass Farm [Online], [Retrieved on Oct. 27, 2000], Retrieved from the Internet <URL:http://www.winrockzoysia.com/Znetinfo.htm>.

* cited by examiner

Primary Examiner—Charles T. Jordan
Assistant Examiner—Francis T. Palo
(74) Attorney, Agent, or Firm—William R. Sharp

(57) ABSTRACT

The invention is a method of processing grass sprigs comprising: digging the sprigs while in a dormant state; placing the thus dug grass sprigs in a plastic enclosure (i.e. a bag); sealing the plastic enclosure; and storing the grass sprigs as contained in the sealed plastic enclosure under predetermined temperature conditions so as to maintain the grass sprigs in the dormant state. The dormant sprigs can be taken out of storage at the desired time and transported to a planting site under substantially the same temperature conditions.

15 Claims, 2 Drawing Sheets

SPRIG PROCESSING METHOD

CROSS-REFERENCE TO RELATED APPLICATIONS

This application claims the benefit of U.S. Provisional Application No. 60/261,651, filed Jan. 12, 2001.

BACKGROUND OF THE INVENTION

The invention relates to a method of processing grass sprigs, such as hybrid Bermuda sprigs.

Most hybrid Bermudas do not produce viable seed in sufficient quantities to provide propagation by seeding. Therefore, such hybrid Bermudas are typically propagated by the planting of sprigs. Sprigs are conventionally dug and planted in the spring when they are actively growing. Actively growing sprigs dry out and die in a short period of time. This means that the sprigs must be dug, transported to the planting site, and planted within a limited time frame of typically only a few days.

SUMMARY OF THE INVENTION

It is an object of the invention to provide a method whereby the time between digging and planting grass sprigs can be considerably increased.

The above object is realized by a method of processing grass sprigs comprising: digging the grass sprigs while in a dormant state; placing the thus dug grass sprigs in a plastic enclosure (i.e. a bag); sealing the plastic enclosure; and storing the grass sprigs as contained in the sealed plastic enclosure under predetermined temperature conditions so as to maintain the grass sprigs in the dormant state. The dormant sprigs can be taken out of storage at the desired time and transported to a planting site under substantially the same temperature conditions, thus allowing transport of grass sprigs to distant locations and even foreign countries.

DETAILED DESCRIPTION OF THE INVENTION

Figure 1:
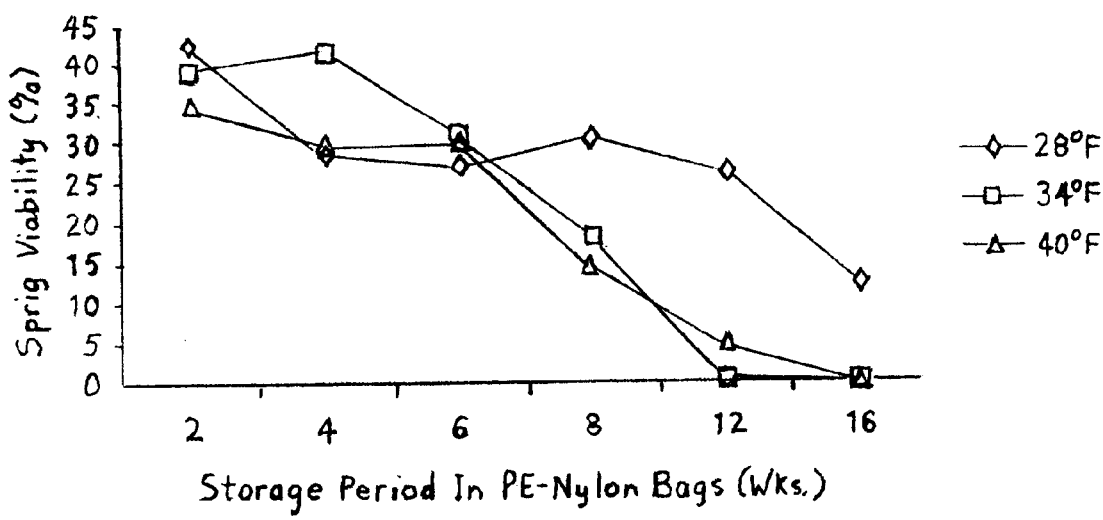
FIGS. 1–4 are graphs based upon data from an example described below. In each FIGURE, "PE" is an abbreviation for polyethylene.

An embodiment of the invention will now be described which employs a baler to produce bales of sprigs for packaging. Such bales are advantageous insofar as being compressed to optimize the number of sprigs per unit volume. However, it should be understood that the invention is not in any way limited to the use of baling in processing sprigs.

Prior to digging the grass sprigs, it is desirable to first remove much of the grass and other vegetation aboveground. This can be done by mowing and/or burning. A grass sprig, as such term is used herein, includes at least the underground portion of the grass plant, including the roots as well as reproductive parts such as stolons, rhizomes, and crown buds.

Digging the sprigs can be carried out as soon as they are in the dormant state. This occurs in the fall, after the first freeze when growth ceases. Any aboveground stems will have a characteristically brown color. Digging is performed by a conventional sprig digger when the soil is in a suitably frangible state. The soil should not be frozen or excessively wet. The sprig digger, as powered by a conventional farm tractor using a drawbar and power takeoff, employs a digger head set at a predetermined depth (typically about 2 inches) to unearth the sprigs. After being dug, the sprigs are very cohesive and take on a matted form for delivery to a conveyor made up of closely adjacent bars that vibrate. Vibration of the bars removes much of the soil from the sprigs. From the conveyor, the sprigs are preferably deposited on the ground in windrows.

A conventional hay baler can be powered by a tractor in the above-mentioned manner to pick up the sprigs and compress them into rectangularly shaped bales in a bale chamber. By way of example, a bale can have the approximate dimensions of 16×14×38 inches. The bale chamber is preferably adjusted to produce a bale of lower than normal density to avoid possible damage to the sprigs, which could result from excessive compaction. Each resulting bale will weigh approximately 50 pounds.

According to typical practice, a trailer is attached to the rear of the baler so as to receive the bales thereon. Workers position themselves in the trailer for further handling of the bales, as will now be described. A mold and mildew retarding agent can be applied to each bale with suitable hand spraying equipment. The retarding agent is preferably in the form of an aqueous solution. One example of such a solution is potassium sorbate powder dissolved in water at a concentration of less than about 0.1 wt. %. Although only the outer surfaces of the bale would be sprayed, at least some of the retarding agent will diffuse into the interior of the bale. After such treatment with the retarding agent, each bale is placed in a plastic bag and sealed by a suitable means such as heat sealing or a zipper closure, and the thus bagged bales are then appropriately stacked in the trailer (most conveniently on pallets). The sealed plastic bag serves to protect the bale of sprigs from the outside environment to thereby maintain a desirable moisture content in the sprigs (preferably at least 30–40 wt. % and most preferably 50–70 wt. %) during subsequent storage and transportation. Of course, the plastic bag should be sufficiently sturdy to avoid puncturing by sprigs in the bale.

The plastic bag is preferably comprised of a single layer of plastic film. The plastic is preferably a polyolefin such as polyethylene. The preferred plastic film provides a desirable balance of low water vapor transmission and high oxygen and carbon dioxide transmission. The environment in the bag is thereby controlled to retain moisture while allowing the sprigs to "respire" for optimum maintenance of viability, as is shown in a subsequent example.

A suitable storage facility is provided that is maintained at a temperature of preferably about 25–45° F. for the purpose of maintaining the sprigs in the dormant state. If plastic bags comprised of a single layer of polyolefin film are used, the storage temperature is preferably about 30–45° F. and most preferably about 35–40° F. for achieving optimum maintenance of viability, as will be apparent from the subsequent example. After transport of the above-mentioned trailer to the storage facility, the bagged bales are removed from the trailer and moved into the storage facility, most conveniently with a forklift if the bales are stacked on pallets. The bales of sprigs can be stored in the storage facility for about 2–16 weeks.

Whenever it is desired to transport the bagged bales to a planting site, the bagged bales are removed from the storage facility (such as with a forklift) and loaded into a suitable means of transport in which the temperature is substantially the same as in the storage facility. Most typically, the bagged bales are loaded into a refrigerated truck. The truck can carry the bagged bales directly to the planting site, or to a seaport or airport for reloading onto a ship or plane having suitably refrigerated compartments. A ship or plane enables transport of the bagged bales to foreign countries, including those in the southern hemisphere where spring is at the same time as fall in the northern hemisphere. Therefore, dormant sprigs can be dug in the United states during the fall, stored for a desired period, and then transported to a country in the southern hemisphere for their spring planting.

Upon arrival at the planting site, the bales are removed from the bags and broken up in any suitable manner for planting with a sprig planting machine. The sprigs can be planted at almost any time that the ground can be worked, although late winter or spring are the best times for planting.

Obviously, many modifications and variations of the present invention are possible in light of the above teachings. For example, as an alternative to hand spraying the bales with retarding agent, the baler could be modified to include a tank for containing the retarding agent and one or more spray nozzles positioned to spray the sprigs with retarding agent before being passed to the bale chamber. This would reduce the amount of required labor and also provide more uniform coverage of the sprigs with retarding agent. According to another variation and as a substitute for or addition to spraying, the above-described retarding agent solution could be frozen in the form of pellets, stored in appropriately insulated containers, and placed into the bag to melt and diffuse into the bale. Use of such pellets would be particularly useful where the bales are too dry (i.e. below 30–40 wt. % moisture content as determined with a commercial moisture tester). A suitable number of pellets could then be placed in the bag to increase the moisture content to an acceptable level. Finally, instead of baling the sprigs and placing the bales in plastic bags, the sprigs could simply be collected from the sprig digger onto a trailer, and then transferred from the trailer (after applying retarding agent if desired) into plastic bags as contained within and lining the inside of respective boxes suitable for storage and transport. It is, therefore, to be understood that the invention can be practiced otherwise than as specifically described.

An example will now be described to further illustrate the invention, but which should not be construed to limit the invention in any manner.

Tifton 44 Bermuda sprigs were used in the experimentation of this example. The sprigs were dug while in the dormant date on a day in early March. A conventional sprig digging machine was used to dig the sprigs. After digging, the sprigs were washed with water to clean away remnants of soil or other debris, and then air dried prior to packaging.

The sprigs were divided into multiple "experimental units" consisting of approximately 50 sprigs per unit. A portion of the 50 sprig units were individually packaged and sealed in Hefty one zip® 2 mil low density polyethylene storage bags (10½×11 in. size), such that each sealed bag contained approximately 50 sprigs. Each such bag is comprised of a single layer of 2 mil thick low density polyethylene film, and has a zipper closure for sealing the bag. A second portion of the 50 sprig units were individually packaged and sealed in bags (11×15 in. size) comprised of two laminated layers of plastic film. One layer is 2.25 mil polyethylene film and the other layer is 0.75 mil nylon film for a total thickness of 3 Mil. These bags were heat sealed. For convenience, the bags comprising the single layer of polyethylene film will hereafter be referred to simply as "polyethylene bags", and the bags comprising the laminated layers of polyethylene and nylon film will be referred to as "polyethylene-nylon bags".

Accordingly, the above-described packaging resulted in a first group of bagged sprigs in the polyethylene bags, and a second group of bagged sprigs in the polyethylene-nylon bags. Each group of bagged sprigs was subdivided into three subgroups, of which each subgroup was placed in storage at a different temperature. The three subgroups were stored at temperatures of 28° F., 34° F., and 40° F., respectively. Only temperature was controlled and monitored in storage. Humidity conditions were ambient. Digging, packaging, and storage of the sprigs were all accomplished within about a 36 hour period. No mold and mildew retarding agent was applied to the sprigs prior to packaging.

At the time the above-mentioned groups of bagged sprigs were placed in storage, four experimental units of dormant sprigs were tested for moisture content (62.69 wt. %) and then planted in a commercial soil mix in four separate pots. The thus planted sprigs were kept in a greenhouse maintained at a temperature of about 75° F. (±5° F.). Humidity conditions were ambient. The planted sprigs were watered daily for 6 weeks. At the end of this 6 week period, the number of sprigs in each experimental unit of 50 sprigs which had germinated and produced shoots emerging from the soil were counted. The percentage of sprigs that had germinated was calculated for each experimental unit to give four viability percentages, which were then averaged to yield an initial (i.e. base) sprig viability of 30.06%. This initial sprig viability is rather low, and could be attributed to the compacted clay soil from which the sprigs were dug and a variety of other environmental variables.

With respect to each subgroup of bagged sprigs stored at its respective temperature as discussed above, four bags of dormant sprigs were taken out of storage after 2, 4, 6, 8, 12, and 16 weeks to test for moisture content and for determination of sprig viability for each storage period using that procedure described with respect to the initial sprig viability. Moisture content did not vary significantly (staying within a relatively narrow range of about 55–67 wt. %) for either type of bag for all temperatures and storage periods, thus indicating that both types of bags desirably acted to prevent moisture loss from the sprigs. The following table indicates the sprig viability percentages obtained with respect to each type of bag for three storage temperatures and six storage periods. In the table, "PE" is an abbreviation for polyethylene.

| Bag Type | Temperature (°F.) | Storage Period (wks.) | Sprig viability (%) |
| --- | --- | --- | --- |
| PE | 28 | 2 | 39.80 |
| PE | 28 | 4 | 28.68 |
| PE | 28 | 6 | 27.33 |
| PE | 28 | 8 | 29.63 |
| PE | 28 | 12 | 20.35 |
| PE | 28 | 16 | 8.80 |
| PE | 34 | 2 | 37.05 |
| PE | 34 | 4 | 35.63 |
| PE | 34 | 6 | 20.83 |
| PE | 34 | 8 | 29.60 |
| PE | 34 | 12 | 25.00 |
| PE | 34 | 16 | 22.70 |
| PE | 40 | 2 | 40.73 |
| PE | 40 | 4 | 31.48 |
| PE | 40 | 6 | 19.45 |
| PE | 40 | 8 | 35.18 |
| PE | 40 | 12 | 34.70 |
| PE | 40 | 16 | 37.03 |
| PE-nylon | 28 | 2 | 42.10 |
| PE-nylon | 28 | 4 | 28.70 |

-continued

| Bag Type | Temperature (°F.) | Storage Period (wks.) | Sprig viability (%) |
|---|---|---|---|
| PE-nylon | 28 | 6 | 26.83 |
| PE-nylon | 28 | 8 | 30.55 |
| PE-nylon | 28 | 12 | 26.40 |
| PE-nylon | 28 | 16 | 12.53 |
| PE-nylon | 34 | 2 | 38.88 |
| PE-nylon | 34 | 4 | 41.43 |
| PE-nylon | 34 | 6 | 31.00 |
| PE-nylon | 34 | 8 | 18.05 |
| PE-nylon | 34 | 12 | 0.48 |
| PE-nylon | 34 | 16 | 0.00 |
| PE-nylon | 40 | 2 | 34.70 |
| PE-nylon | 40 | 4 | 29.63 |
| PE-nylon | 40 | 6 | 30.08 |
| PE-nylon | 40 | 8 | 14.45 |
| PE-nylon | 40 | 12 | 5.10 |
| PE-nylon | 40 | 16 | 0.00 |

Figure 2:
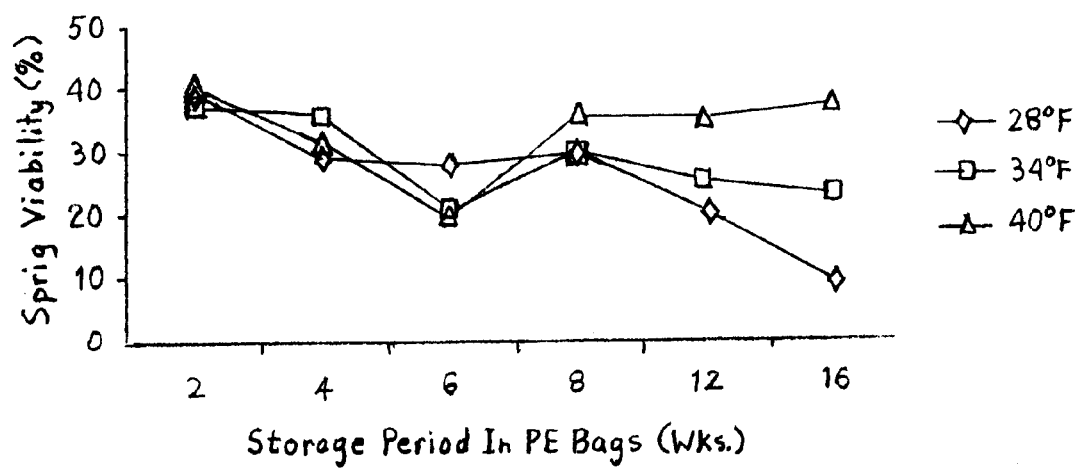

Considering sprig viability as a function of storage period for each of the three storage temperatures, the data from the table is graphically plotted in FIG. 1 for the polyethylene-nylon bags and in FIG. 2 for the polyethylene bags. FIGS. 1 and 2 show that clearly positive sprig viability percentages are maintained for each type of bag at all storage temperatures up to 8 weeks. However, FIG. 2 shows that the viability of sprigs stored in polyethylene bags was substantially unaffected after 8 weeks at all storage temperatures. FIG. 2 further shows that after 16 weeks, sprig viability remains unaffected at 40° F. and decreases only to some extent at 34° F., but decreases markedly at 28° F.

Figure 3:
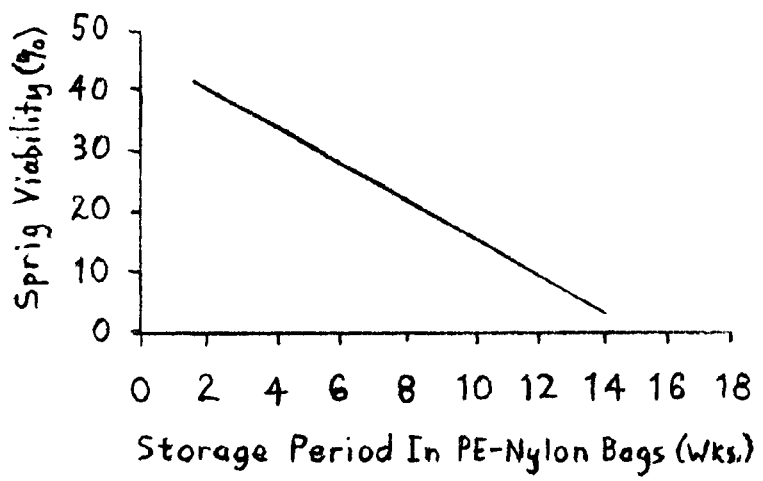
Figure 4:
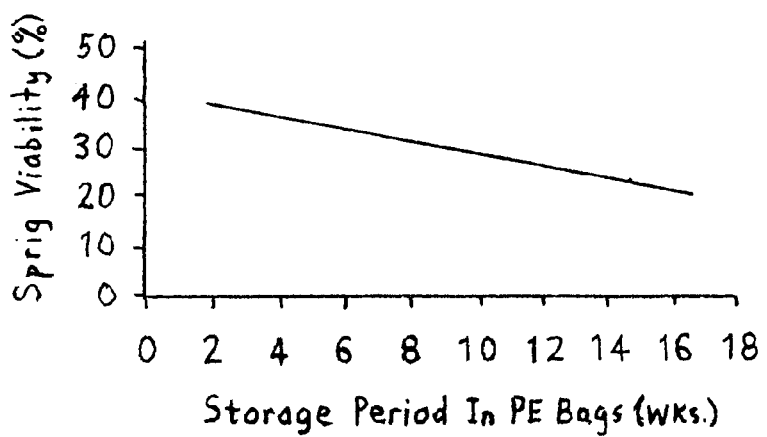

For each type of bag, sprig viability data corresponding to each storage period was subjected to regression analysis with statistical analysis software to approximate sprig viability as a linear function of storage period. Linear plots resulting from the regression analysis are shown in FIGS. 3 and 4, which indicate a lower reduction in sprig viability per storage increment for the polyethylene bags.

In conclusion, the polyethylene bags, composed of the single layer of polyethylene (a polyolefin) film, were clearly superior in maintaining viability of the sprigs. Although the sprigs were dormant, continuing but slower cellular functions still require the gaseous exchange of carbon dioxide and oxygen. Moisture must also be retained in the dormant sprigs for proper cellular functioning. The single layer of polyethylene film allows an adequate rate of gaseous exchange therethrough while still preventing loss of moisture for optimum maintenance of viability. The laminated polyethylene-nylon film is equally effective at preventing moisture loss, but is less permeable to carbon dioxide and oxygen.

That which is claimed is:

1. A method of processing grass sprigs comprising:
 digging the grass sprigs while in a dormant state;
 placing the thus dug grass sprigs in a plastic bag;
 sealing the plastic bag; and
 storing the grass sprigs as contained in the sealed plastic bag under temperature conditions in the range of about 25–45° F. so as to maintain the grass sprigs in the dormant state.

2. A method as recited in claim 1 wherein the grass sprigs are Bermuda sprigs.

3. A method as recited in claim 1 wherein the plastic bag is comprised of a single layer of plastic film.

4. A method as recited in claim 3 wherein the plastic is a polyolefin.

5. A method as recited in claim 4 wherein the plastic is polyethylene.

6. A method as recited in claim 4 wherein said temperature conditions are in the range of about 30–45° F.

7. A method as recited in claim 6 wherein said temperature conditions are in the range of about 35–40° F.

8. A method as recited in claim 1 further comprising applying a mold and mildew retarding agent to the sprigs after digging but before being placed in the plastic bag.

9. A method as recited in claim 8 wherein the mold and mildew retarding agent is in the form of an aqueous solution.

10. A method as recited in claim 1 wherein the grass sprigs are stored for a period of about 2–16 weeks.

11. A method as recited in claim 10 further comprising transporting the grass sprigs as contained in the sealed plastic bag under said temperature conditions after storage for said period.

12. A method of processing grass sprigs comprising:
 digging the grass sprigs while in a dormant state;
 placing the thus dug grass sprigs in a plastic bag comprised of a single layer of plastic film;
 sealing the plastic bag; and
 storing the grass sprigs as contained in the sealed plastic bag under conditions in which only the temperature is controlled within a range of about 25–45° F. to thereby maintain the grass sprigs in the dormant state.

13. A method as recited in claim 12 wherein the plastic is a polyolefin.

14. A method as recited in claim 13 wherein the temperature range is about 30–45° F.

15. A method of processing grass sprigs comprising:
 digging the grass sprigs while in a dormant state;
 placing the thus dug grass sprigs in a plastic bag:
 sealing the plastic bag;
 storing the grass sprigs as contained in the sealed plastic bag for a period of time under temperature conditions in the range of about 25–45° F. so as to maintain the grass sprigs in the dormant state; and
 transporting the grass sprigs as contained in the sealed plastic bag under said temperature conditions after storage for said period.

* * * * *